(12) United States Patent
McNair et al.

(10) Patent No.: US 8,813,214 B1
(45) Date of Patent: Aug. 19, 2014

(54) METHOD AND SYSTEM FOR PROVIDING SECURE PEER-TO-PEER FILE TRANSFERS

(75) Inventors: David Trent McNair, Boise, ID (US);
Russill Justin Wells, Toronto (CA);
Brian Catz, Melville, NY (US)

(73) Assignee: Symantec Corporation, Mountain View, CA (US)

( * ) Notice: Subject to any disclaimer, the term of this patent is extended or adjusted under 35 U.S.C. 154(b) by 397 days.

(21) Appl. No.: 13/208,857

(22) Filed: Aug. 12, 2011

(51) Int. Cl.
*G06F 9/00* (2006.01)
*G06F 11/00* (2006.01)

(52) U.S. Cl.
USPC .............................................. 726/12; 726/22

(58) Field of Classification Search
USPC ..................................................... 726/12, 22
See application file for complete search history.

(56) References Cited

U.S. PATENT DOCUMENTS 7,170,999 B1 * 1/2007 Kessler et al. ................. 380/277
2007/0169184 A1 * 7/2007 Krywaniuk ....................... 726/11

* cited by examiner

*Primary Examiner* — Teshome Hailu
(74) *Attorney, Agent, or Firm* — Wilmer Cutler Pickering Hale and Dorr LLP

(57) ABSTRACT

A method and system for providing secure peer-to-peer file transfers whereby request/negotiation message mechanisms used to negotiate file transfers between peers is used to identify/intercept, and block, direct file transfers. The request/negotiation messages are then replaced with messages sent to both peers that include upload and download URL links through which the file can be uploaded, scanned analyzed, and then transferred, via a secure file transfer server. Using the method and system for providing secure peer-to-peer file transfers disclosed herein, peer-to-peer file transfer transactions are provided protection from malware, and provided additional data security, so that peer-to-peer users can utilize this important capability without taking unacceptable risks.

20 Claims, 6 Drawing Sheets

METHOD AND SYSTEM FOR PROVIDING SECURE PEER-TO-PEER FILE TRANSFERS

BACKGROUND OF THE INVENTION

As various types computing systems have become more and more prevalent, so has the use of "non-traditional" computing system-based communications. In particular, "real-time" communication systems, such as Chat, Instant Messaging (IM), and various other text and/or peer-to-peer communication systems, have become an increasing popular form of communication.

IM is a form of real-time direct text-based communication between two or more people using personal computers, mobile computing systems or other devices, along with shared clients. The IM user's text is conveyed over a network, such as the Internet, and/or any cloud or communication network, typically via one or more proxy server systems. More advanced IM systems also allow enhanced modes of communication, such as live voice or video calling. Herein, the term Instant Messaging, or IM, includes any form of peer-to-peer communication systems as discussed herein, and/or as known in the art at the time of filing, and/or as developed after the time of filing.

One capability IM users, or any communication system users, consider a core feature is the ability to transfer files. As with any file transfer system, is it highly desirable to ensure that files being transferred via an IM system are safe, i.e., free of malware such as viruses, spam, or other forms of malicious and/or unwanted content. However, scanning/analyzing IM traffic, and file transfers, for malware poses significant issues that are not readily addressed using more conventional computing system communication systems and file transfer scanning/security systems.

Currently, IM system-based file transfer analysis and/or security is typically accomplished using various file transfer analysis modules that understand, and can analyze, various file transfer protocols associated with IM systems. However, currently, creating these transfer analysis modules often involves producing complete implementations of a variety of direct file transfer protocols, usually requiring reverse engineering those protocols. Consequently, currently, transfer analysis modules are extremely costly to create and maintain due the numerous variations of file transfer protocols associated with each IM architecture, and the numerous versions typically in use for each IM architecture. As a result, currently, there are often gaps in coverage as only some IM architectures, and/or versions of IM architectures, are supported for file transfer analysis.

In addition, there are also several security related issues associated with current IM file transfer mechanisms, including lack of encryption and the undesirable exposure of information, such as a party's IP address, to IM users.

As a result of the situation discussed above, many IM-based file transfer transactions currently take place without adequate protection from malware and/or without sufficient security, or the file transfer transactions are currently not allowed, i.e., blocked, because there is no mechanism in place for providing adequate protection from malware, and/or sufficient security. Consequently, currently, IM users are often forced to either take unacceptable file transfer risks, or they are denied capabilities they strongly desire.

SUMMARY

According to one embodiment, a method and system for providing secure peer-to-peer file transfers includes a process for providing secure peer-to-peer file transfers whereby direct file transfer request/negotiation messages sent between a potential sending peer and a potential recipient peer through Instant Messaging (IM), Chat, and other peer-to-peer communication systems, are identified and/or intercepted. In one embodiment, the direct file transfer request/negotiation messages are then blocked, thereby blocking the direct file transfer. In one embodiment, upload and download URL's are then sent to the sending peer and the recipient peer, respectively. In one embodiment, the upload and download URLs direct the sending peer and recipient peer to distinct upload and download webpages where they are able to complete a secure file transfer using a secure file transfer server. In one embodiment, the sending peer then selects and uploads the file to be transferred to the secure file transfer server using the upload URL, and upload webpage. In one embodiment, the uploaded file to be transferred is then scanned for malware, and/or any other desired analysis of the uploaded file is performed. In one embodiment, if the uploaded file to be transferred "fails" the scanning/analysis, the file transfer is blocked and both the sending and recipient peer are informed that the file transfer was blocked. In one embodiment, if the uploaded file to be transferred does "pass" the scanning/analysis, the status of the uploaded file to be transferred is transformed to that of "approved transfer file". In one embodiment, the recipient peer then downloads the approved transfer file using the download URL, and download website. In one embodiment, once the approved transfer file is downloaded by the recipient peer, both the sending and recipient peer are informed that the desired file transfer was completed.

Using the method and system for providing secure peer-to-peer file transfers disclosed herein, the ubiquitous use of request/negotiation message mechanisms by IM services to negotiate file transfers between peers is used to identify/intercept and block direct file transfers. The request/negotiation messages are then replaced with messages sent to both peers that include upload and download URL links through which the file can be uploaded, scanned and analyzed, and then transferred, via a secure file transfer server. Consequently, using the method and system for providing secure peer-to-peer file transfers disclosed herein, IM file transfer transactions are provided protection from malware, and provided additional data security, so that IM users can utilize this important capability without taking unacceptable risks.

Figure 1:
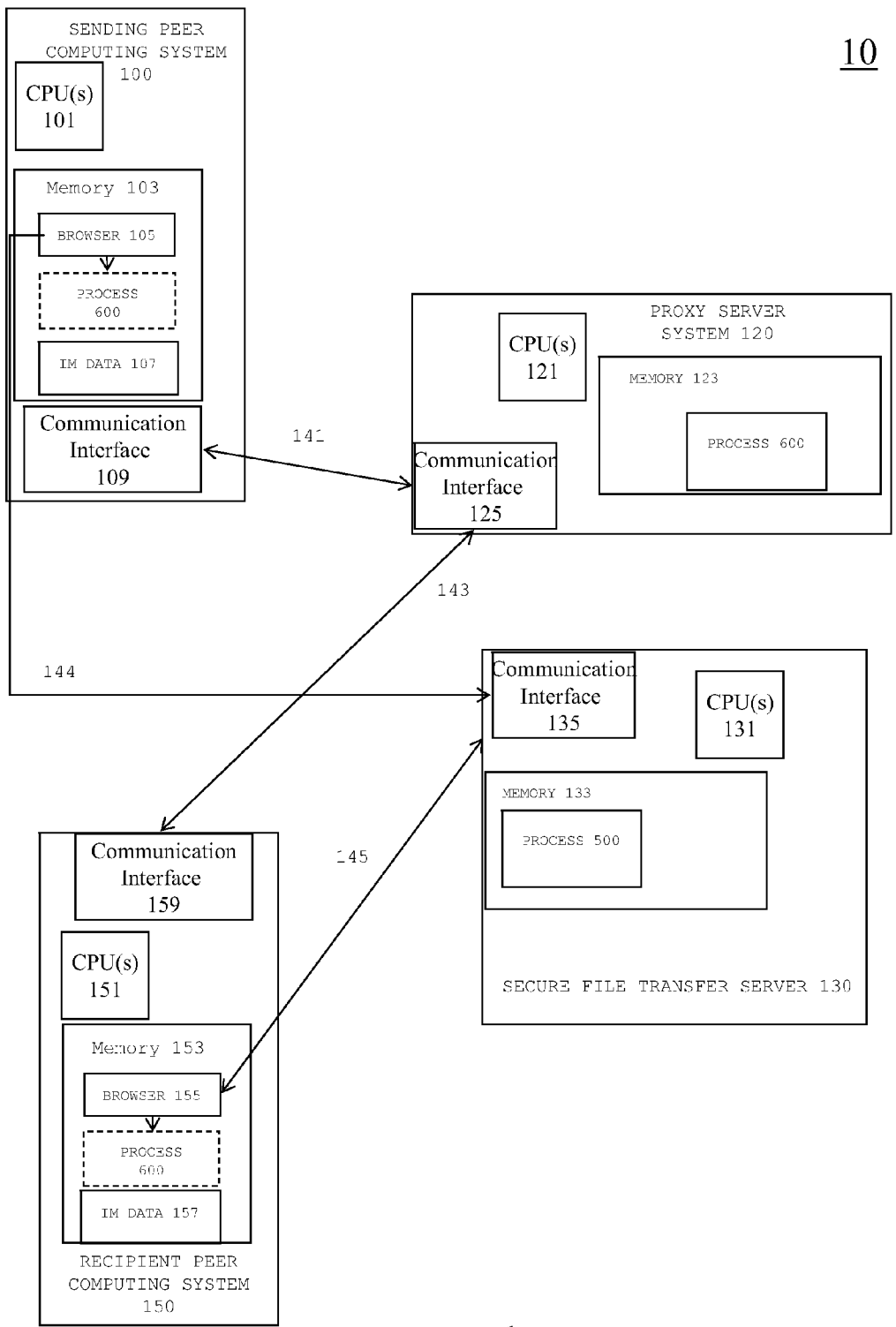
FIG. 1 is a block diagram of an exemplary hardware architecture for implementing one embodiment including a sending peer computing system, a proxy server system, a secure file transfer server (SFTS), and a recipient peer computing system, all commutatively coupled by communication links/channels, in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

According to one embodiment, a method and system for providing secure peer-to-peer file transfers includes a process for providing secure peer-to-peer file transfers whereby a secure file transfer server (SFTS) is provided through which a sending peer can perform a secure file transfer to a recipient peer.

In various embodiments, the secure file transfer server can be any computing system as discussed herein, and/or as known in the art at the time of filing, and/or as developed/made available after the time of filing.

As used herein: the term "computing system", such includes, but is not limited to: a desktop computing system; a portable computer; a workstation; a server computing system; a two-way pager; a cellular telephone; a smart phone; a digital wireless telephone; a Personal Digital Assistant (PDA); a media player, i.e., an MP3 player and/or other music and/or video player; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, the secure file transfer server can be two or more computing systems and/or two or more secure file transfer servers can be provided.

In one embodiment, the secure file transfer server is in communication with, and/or is otherwise accessible by, one or proxy server systems providing communication between two or more computing systems, such as a sending peer computing system and/or a recipient peer computing system, via an Instant Messaging (IM), Chat, and other peer-to-peer communication systems.

As noted above, herein, the term Instant Messaging, or IM, includes any form of "real-time" peer-to-peer communication system as discussed herein, and/or as known in the art at the time of filing, and/or as developed/made available after the time of filing.

In one embodiment, the secure file transfer server hosts an HTTP/HTTPS secure file transfer system and one or more upload and download webpages accessed via one or more upload and download URLs.

As noted above, in one embodiment, the ubiquitous use of request/negotiation message mechanisms by IM services to negotiate file transfers between peers is used to identify/intercept and block direct file transfers.

To this end, in one embodiment, when a sending peer sends a request/negotiation message from a sending peer computing system to a recipient peer, and recipient peer computing system, indicating a desire to directly transfer a file to the recipient peer computing system, the request/negotiation message is identified and/or intercepted by the proxy server system. In one embodiment, the request/negotiation message is then automatically blocked by the proxy server system, thereby blocking the direct file transfer.

In one embodiment, the proxy server system then registers a request for a file transfer session with the secure file transfer server. In one embodiment, the proxy server system then registers a request for a file transfer session with the secure file transfer server by making an HTTPS request to the secure file transfer server.

In one embodiment, as part of the request for a file transfer session, the proxy server system transfers data associated with the peers to the secure file transfer server, such as, but not limited to: data identifying the sending peer and/or recipient peer; data indicating an enrollment/protection subscription status the sending peer and/or recipient peer; data indicating the state of the sending peer and/or recipient peer computing systems, and/or any transfer request/negotiation messages.

In one embodiment, the secure file transfer server validates the data associated with the peers and stores the request parameter data. In one embodiment, the secure file transfer server validates the data associated with the peers and stores the request parameter data under the direction of one or more processors associated with one or more computing systems.

In one embodiment, the secure file transfer server then sends an upload URL and a download URL to the proxy server system. In one embodiment, the upload URL and the download URL link to distinct upload webpages and download webpages hosted by the secure file transfer server. In one embodiment, once a request for a file transfer session has been registered with the secure file transfer server, and/or the upload URL and the download URL have been transferred to the proxy server system, the file transfer must be initiated within a configurable/defined amount of time, or else the request will be automatically cancelled.

In one embodiment, the proxy server system then sends a message to the sending peer computing system through the IM system that includes the upload URL and directions for using the secure file transfer server for the file transfer.

In one embodiment, the proxy server system also sends a message to the recipient peer computing system through the IM system that includes the download URL and directions for using the secure file transfer server for the file transfer.

In one embodiment, the sending peer and the recipient peer click, or otherwise activate, their respective upload and download URLs and access their respective upload and download webpages. In one embodiment, the sending peer and the recipient peer access their respective upload and download webpages via their respective web browsers running on their respective sending peer and recipient peer computing systems using one or more user interface devices such as a keyboard, a mouse, a touchpad, voice recognition systems, or any other means, mechanism, process, and/or procedure for converting user actions into computing system instructions.

In one embodiment, once the sending peer and the recipient peer click, or otherwise activate, their respective upload and download URLs, the file transfer begins. In another embodiment, a second authentication factor is used to identify the peers to provide greater security. As a specific example, in embodiments were a public IM system is used, a second authentication factor such as OpenID™, available at http://openid.net/, is used.

In one embodiment, the sending peer selects the file to be transferred from a data store associated with the sending peer computing system. In one embodiment, the sending peer selects the file to be transferred from a data store associated with the sending peer computing system and begins the transfer process via a "drag and drop" operation.

In one embodiment, once the sending peer selects the file to be transferred, the upload of the selected file to the secure file transfer server is begun through the upload URL, and the associated upload webpage.

In one embodiment, as the selected file to be transferred is being uploaded to the secure file transfer server, the upload progress is displayed to both the sending peer computing system and recipient peer computing system, in one embodiment by providing an upload progress bar on the respective browsers running on the sending peer computing system and recipient peer computing system.

In one embodiment, once the selected file to be transferred is completely uploaded to the secure file transfer server, the selected file to be transferred is scanned, and/or any desired analysis is performed. In one embodiment, the selected file to be transferred is scanned, and/or any desired analysis is performed, under the direction of one or more processors associated with one or more computing systems.

In one embodiment, the selected file to be transferred is scanned for malware such as viruses, spam, or other forms of malicious and/or unwanted content. In one embodiment, the selected file to be transferred is scanned for malware such as viruses, spam, or other forms of malicious and/or unwanted content using one or more security systems as discussed herein, and/or as known in the art at the time of filing, and/or as developed/made available after the time of filing. Numerous methods, means, processes, procedures, and systems for scanning files and data for malware such as viruses, spam, or other forms of malicious and/or unwanted content, are known in the art. Consequently, a more detailed discussion of particular methods, means, processes, procedures, and systems for scanning files and data for malware such as viruses, spam, or other forms of malicious and/or unwanted content, are omitted here to avoid detracting from the invention.

In one embodiment, if the uploaded selected file to be transferred "fails" the scanning and/or analysis, e.g., malware such as viruses, spam, or other forms of malicious and/or unwanted content are found in the uploaded selected file, then the transfer of the selected file is blocked and both the sending peer computing system and recipient peer computing system are sent messages indicating that the file transfer has been blocked.

In one embodiment, if the uploaded selected file to be transferred "passes" the scanning and/or analysis, e.g., malware such as viruses, spam, or other forms of malicious and/or unwanted content are not found in the uploaded selected file, then data indicating a status of the uploaded selected file to be transferred is transformed to a status of "approved transfer file".

In one embodiment, if the uploaded selected file to be transferred "passes" the scanning and/or analysis, e.g., malware such as viruses, spam, or other forms of malicious and/or unwanted content, are not found in the uploaded selected file, then data indicating a status of the uploaded selected file to be transferred is transformed to a status of "approved transfer file" under the direction of one or more processors associated with one or more computing systems.

In one embodiment, the now approved transfer file is made available for transfer to the recipient peer computing system. In one embodiment, the approved transfer file is downloaded to the recipient peer computing system automatically so long as the downloaded URL remains activated on the recipient peer computing system.

In one embodiment, as the approved transfer file is downloaded to the recipient peer computing system, the sending peer's upload page/browser displays a status bar to track the download. In one embodiment, the recipient peer's download page/browser also displays a native progress bar to track the download, typically in a dialog box.

In one embodiment, upon completion of the download of the approved transfer file to the recipient peer computing system, a message is sent to both the sending peer and the recipient peer from the proxy server system indicating that the approved transfer file download has finished.

Hardware

FIG. 1 shows a block diagram of an exemplary hardware system 10 suitable for implementing one embodiment of a process for providing secure peer-to-peer file transfers, such as exemplary process 600 of FIG. 6, discussed below. Returning to FIG. 1, exemplary hardware system 10 includes: sending peer computing system 100, i.e., a first peer computing system accessible by a sending peer party desiring to transfer a file; proxy server system 120, i.e., a proxy server system through which one or more computing systems communicate via an IM system; secure file transfer server 130, i.e., a server system through which a sending peer can perform a secure file transfer to a recipient peer computing system; recipient peer computing system 150, i.e., a second peer computing system accessible by a recipient peer party desiring to receive a file from sending peer computing system 100; all operatively coupled by communications links/channels 141, 143, 144, and 145.

In one embodiment, sending peer computing system 100 is used by a sending peer party to transfer files to other computing systems, such as recipient peer computing system 150, via an IM system, and proxy server system 120.

In one embodiment, sending peer computing system 100 is a client computing system. In one embodiment, sending peer computing system 100 is a server computing system that is, in turn, associated with one or more client computing systems. In one embodiment, sending peer computing system 100 is representative of multiple sending peer computing systems.

As used herein: the term "computing system", such as is included in the term "sending peer computing system"; and "recipient peer computing system" includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computing system; an Internet appliance; or any other device that includes components that can execute all, or part, of any one of the processes and/or operations as described herein. In addition, as used herein, the term computing system, can denote, but is not limited to, computing systems made up of multiple: computing systems; wireless devices; cellular telephones; digital telephones; two-way pagers; PDAs; media players; server computing systems; or any desired combination of these devices, that are coupled to perform the processes and/or operations as described herein.

In various embodiments, sending peer computing system 100 can be any computing system as defined herein and/or as known in the art at the time of filing and/or as developed thereafter, that includes components that can execute all, or part, of a process for providing secure peer-to-peer file transfers in accordance with at least one of the embodiments as described herein.

As shown in FIG. 1, sending peer computing system 100 includes one or more processors, i.e., CPU(s) 101, and a memory system, memory 103, that includes all or part of procedures, data, and/or instructions associated with a process for providing secure peer-to-peer file transfers, i.e., process 600.

In one embodiment, memory 103 includes IM data 107 that is all, or part, of procedures, data, and/or instructions associated with an IM system, such as any IM system as discussed herein, and/or as known in the art at the time of filing, and/or as developed/made available after the time of filing.

In one embodiment, sending peer computing system 100 also includes a sending peer computing system web browser, i.e., browser 105. As seen in FIG. 1, browser 105 is commutatively coupled to communication interface 135 of secure file transfer server 130 by communication link 144.

As seen in FIG. 1, sending peer computing system 100 includes communication interface 109 that, in one embodiment, is commutatively coupled to communication interface 125 of proxy server system 120 by communication link 141.

Sending peer computing system 100 and memory 103 are discussed in more detail below with respect to FIG. 2.

Also seen in FIG. 1 is proxy server system 120. In one embodiment, proxy server system 120 is a computing system through which one or more other computing systems communicate via an IM system provided through proxy server system 120.

As seen in FIG. 1, in one embodiment, proxy server system 120 includes one or more processors, i.e., CPU(s) 121, and a memory system, memory 123.

In one embodiment, memory 123 includes all or part of procedures, data, and/or instructions associated with a process for providing secure peer-to-peer file transfers, i.e., process 600.

In various embodiments, proxy server system 120 is any computing system as defined herein, and/or as known in the art at the time of filing, and/or as developed/made available thereafter, or any desired combination of devices, that are coupled to perform the processes and/or operations as described herein.

In various embodiments, proxy server system 120 is representative of multiple proxy server systems.

In one embodiment, proxy server system 120 includes communication interface 125 that is communicatively coupled to: communication interface 109 of sending peer computing system 100, via communication link 141; and communication interface 159 of recipient computing system 150, via communication link 143.

Proxy server system 120 and memory 123 are discussed in more detail below with respect to FIG. 3.

Also shown in FIG. 1 is secure file transfer server 130.

In various embodiments, secure file transfer server 130 is any computing system as defined herein, and/or as known in the art at the time of filing, and/or as developed/made available thereafter, or any desired combination of devices, that are coupled to perform the processes and/or operations as described herein.

In various embodiments, secure file transfer server 130 is representative of multiple secure file transfer servers.

In various embodiments, secure file transfer server 130 and proxy server system 120 are representative of functionality performed by multiple computing systems. In various embodiments, secure file transfer server 130 and proxy server system 120 are representative of functionality performed by the same computing system, or systems.

As shown in FIG. 1, secure file transfer server 130 includes one or more processors, i.e., CPU(s) 131, memory 133, and communication interface 135.

In one embodiment, memory 133 includes all or part of procedures, data, and/or instructions associated with a process for providing secure peer-to-peer file transfers, i.e., process 600.

Secure file transfer server 130 and memory 133 are discussed in more detail below with respect to FIG. 4.

Also shown in FIG. 1 is recipient peer computing system 150. In one embodiment, recipient peer computing system 150 is used by a recipient peer party to receive transfer files from other computing systems, such as sending peer computing system 100, via an IM system, and proxy server system 120.

In one embodiment, recipient peer computing system 150 is a client computing system. In one embodiment, recipient peer computing system 150 is a server computing system that is, in turn, associated with one or more client computing systems. In one embodiment, recipient peer computing system 150 is representative of multiple sending peer computing systems.

In various embodiments, recipient peer computing system 150 can be any computing system as defined herein and/or as known in the art at the time of filing, and/or as developed thereafter, that includes components that can execute all, or part, of a process for providing secure peer-to-peer file transfers in accordance with at least one of the embodiments as described herein.

As shown in FIG. 1, recipient peer computing system 150 includes one or more processors, i.e., CPU(s) 151, and a memory system, memory 153, that includes all or part of procedures, data, and/or instructions associated with a process for providing secure peer-to-peer file transfers, i.e., process 600.

In one embodiment, memory 153 includes IM data 157 that is all, or part, of procedures, data, and/or instructions associated with an IM system, such as any IM system as discussed herein, and/or as known in the art at the time of filing, and/or as developed/made available after the time of filing.

In one embodiment, recipient peer computing system 150 also includes a recipient peer computing system web browser, i.e., browser 155. As seen in FIG. 1, browser 155 is commutatively coupled to communication interface 135 of secure file transfer server 130 by communication link 145.

As seen in FIG. 1, recipient peer computing system 150 includes communication interface 159 that, in one embodiment, is commutatively coupled to communication interface 125 of proxy server system 120 by communication link 143.

Recipient peer computing system 150 and memory 153 are discussed in more detail below with respect to FIG. 5.

As seen in FIG. 1, and as discussed above, in one embodiment, sending peer computing system 100, proxy server system 120, secure file transfer server 130, and recipient peer computing system 150 are commutatively linked/coupled via communications links/channels 141, 143, 144, and 145. In various embodiments, any, or all, of communications links/channels 141, 143, 144, and 145 can be, but are not limited to: the Internet, a cloud, or other network communications link/channel; a mobile phone link; a land-line phone link; a cable-based communications link/channel; a satellite communications link/channel; and/or any other communications link/channel, or combination of communications link/channels, as discussed herein, and/or as known in the art at the time of filing, and/or as developed after the time of filing.

In various embodiments, sending peer computing system 100, proxy server system 120, secure file transfer server 130, and recipient peer computing system 150 are connected via a cloud.

According to one embodiment, direct file transfer request/negotiation messages sent between sending peer computing system 100 and recipient peer computing system 150 through Instant Messaging (IM), Chat, and other peer-to-peer communication systems, provided through proxy server system 120, are identified and/or intercepted by proxy server system 120. In one embodiment, the direct file transfer request/negotiation messages are then blocked, thereby blocking the direct file transfer.

In one embodiment, upload and download URL's are then sent to sending peer computing system 100 and recipient peer computing system 150, respectively. In one embodiment, the upload and download URLs direct the sending peer and recipient peer to distinct upload and download webpages hosted by secure file transfer server 130 where they are able to complete a secure file transfer using secure file transfer server 130.

In one embodiment, the sending peer then selects and uploads the file to be transferred to secure file transfer server 130 using the upload URL, and upload webpage. In one embodiment, the uploaded file to be transferred is then scanned for malware, and/or any other desired analysis of the uploaded file is performed by secure file transfer server 130.

In one embodiment, if the uploaded file to be transferred does not "pass" the scanning/analysis, the file transfer is blocked and both the sending and recipient peers are informed that the file transfer was blocked.

In one embodiment, if the uploaded file to be transferred does "pass" the scanning/analysis, the status of the uploaded file to be transferred is transformed to that of "approved" transfer file. In one embodiment, recipient peer computing system 150 then downloads the approved transfer file using the download URL, and download website. In one embodiment, once the approved transfer file is downloaded by the recipient peer computing system, both the sending and recipient peers are informed that the desired file transfer was completed.

Figure 2:
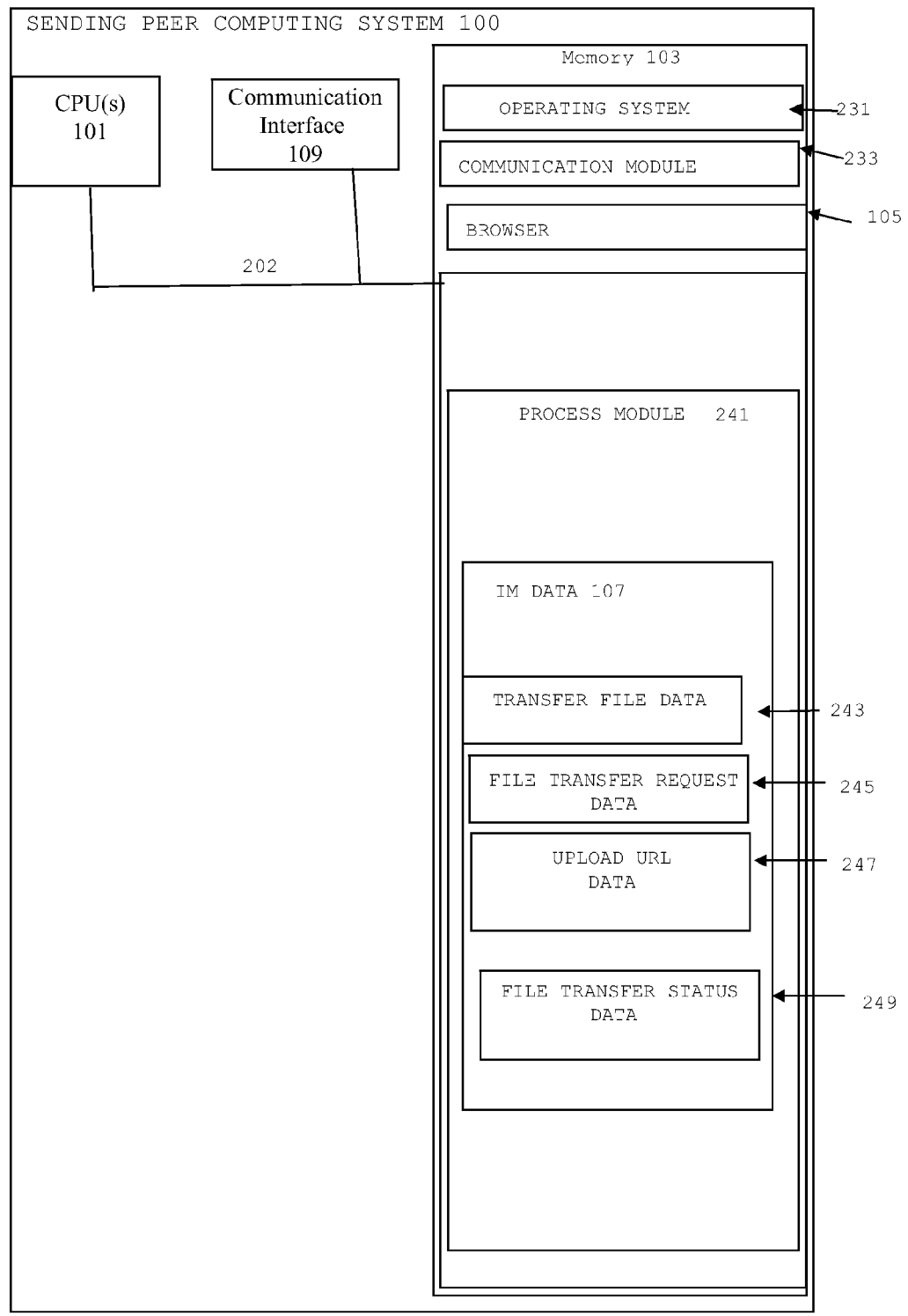
FIG. 2 is a block diagram of the sending peer computing system of FIG. 1, in accordance with one embodiment.

Referring now to FIGS. 1 and 2 together, FIG. 2 is a more detailed block diagram of sending peer computing system 100.

As seen in FIG. 2, sending peer computing system 100 includes CPU(s) 101 coupled to memory 103 and communication interface 109 by bus 202.

As seen in FIG. 2, in one embodiment, memory 103 can store data and/or instructions associated with, but not limited to, the following elements, subsets of elements, and/or supersets of elements for processing by one or more processors, such as CPUs 101, 121, 131, 151: operating system 231 that includes procedures, data, and/or instructions for handling various services and performing/coordinating hardware dependent tasks; communication module 233 that includes procedures, data, and/or instructions for providing, along with communication interface 109, a data transfer capability between sending peer computing system 100, proxy server system 120, and/or recipient peer computing system 150; browser module 105 that includes procedures, data, and/or instructions for providing one or more web browsers, and/or a web browser capability and providing communication with secure file transfer server 130; process module 241 that includes procedures, data, and/or instructions, for implementing at least part of a process for providing secure peer-to-peer file transfers 600; and IM data 107.

As also seen in FIG. 2, in one embodiment, IM data 107 of memory 153 includes: transfer file data 243 representing the selected file to be transferred from sending peer computing system 100 to recipient peer computing system 150; file transfer request data 245 representing direct file transfer request/negotiation messages sent between sending peer computing system 100 and recipient peer computing system 150 through Instant Messaging (IM), Chat, and other peer-to-peer communication systems, provided through proxy server system 120; upload URL data 247 representing upload URL's and instructions for transferring a file through secure file transfer server 130; and file transfer status data 249 representing a message sent to peer computing system 100 indicating whether a desired file transfer has taken place, is taking place, or has been blocked.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of sending peer computing system 100, memory 103, and process 600 is provided below with respect to FIG. 6.

Figure 3:
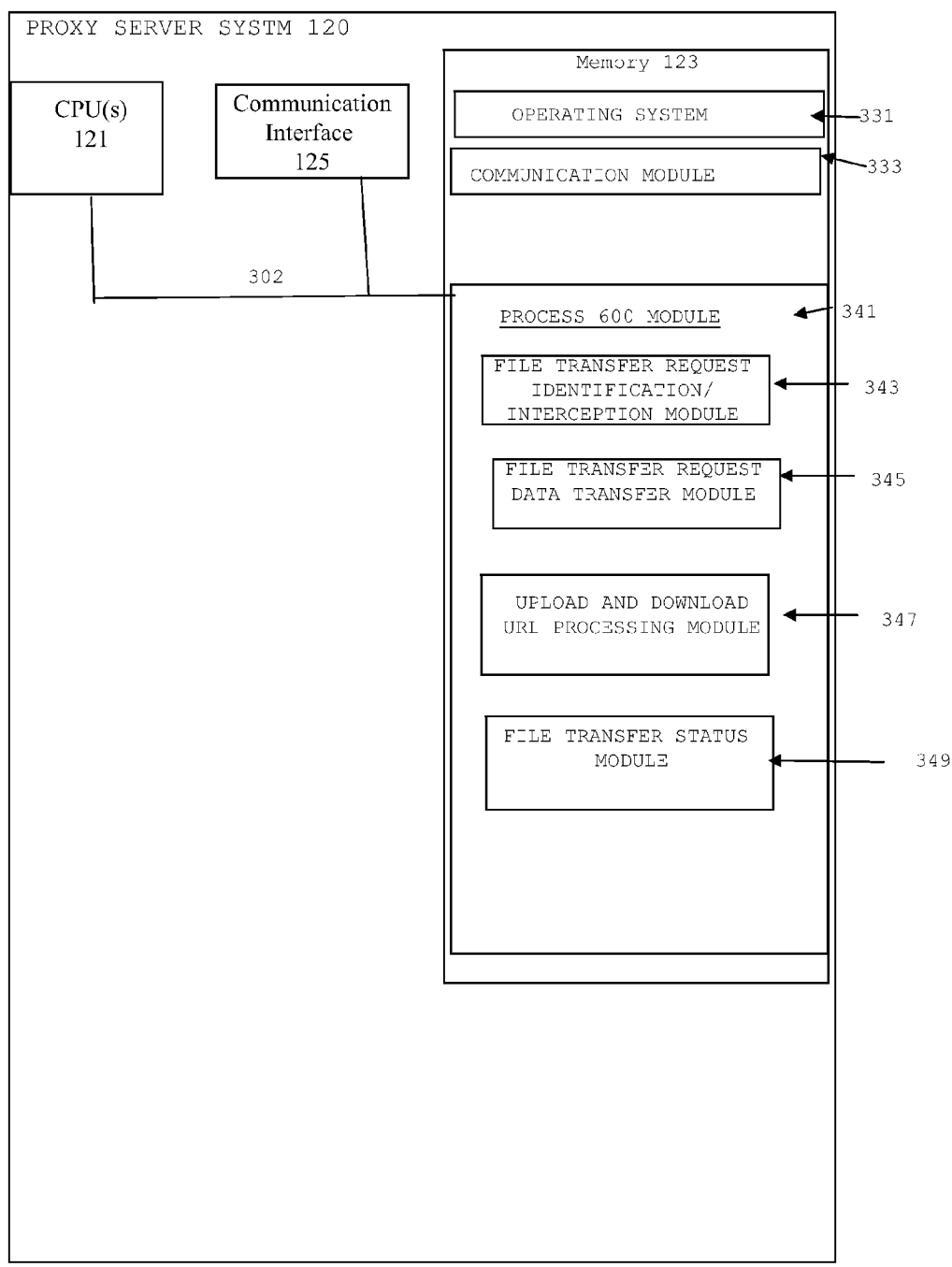
FIG. 3 is a block diagram of the proxy server system of FIG. 1, in accordance with one embodiment.

Referring now to FIGS. 1 and 3 together, FIG. 3 is a more detailed block diagram of proxy server system 120.

As seen in FIG. 3, proxy server system 120 includes CPU (s) 121 coupled to memory 123 and communication interface 125 by bus 302.

As seen in FIG. 3, in one embodiment, memory 123 can store data and/or instructions associated with, but not limited to, the following elements, subsets of elements, and/or supersets of elements, for processing by one or more processors, such as CPUs 101, 121, 131, 151: operating system 331 that includes procedures, data, and/or instructions for handling various services and performing/coordinating hardware dependent tasks; communication module 333 that includes procedures, data, and/or instructions for providing, along with communication interface 125, a data transfer capability between proxy server system 120, sending peer computing system 100, secure file transfer server 130, and recipient peer computing system 150; and process 600 module 341 that includes procedures, data, and/or instructions, for implementing at least part of a process for providing secure peer-to-peer file transfers 600.

As also seen in FIG. 3, in one embodiment, process 600 module 341 of memory 123 includes file transfer request identification/interception module 343 that includes procedures, data, and/or instructions for identifying and/or intercepting file transfer request/negotiation messages, such as file transfer request data 245 of FIG. 2, sent between sending peer computing system 100 and recipient peer computing system 150 through Instant Messaging (IM), Chat, and other peer-to-peer communication systems, provided through proxy server system 120.

In one embodiment, process 600 module 341 of memory 123 includes file data request data transfer module 345 that includes procedures, data, and/or instructions for making a request for a file transfer session with secure file transfer server 130. In one embodiment, proxy server system 120 registers a request for a file transfer session with secure file transfer server 130 by making an HTTPS request to the secure file transfer server. In one embodiment, as part of the request for a file transfer session, the proxy server system transfers data associated with the peers to the secure file transfer server, such as, but not limited to: data identifying the sending peer and/or recipient peer; data indicating an enrollment/protection subscription status the sending peer and/or recipient peer; data indicating the state of the sending peer and/or recipient peer computing systems and/or transfer request/negotiation messages.

In one embodiment, process 600 module 341 of memory 123 includes upload and download URL processing module 347 that includes procedures, data, and/or instructions for receiving upload and download URLs from secure file transfer server 130 and transmitting the upload URL to sending peer computing system 100 and transmitting the download URL to recipient peer computing system 150.

In one embodiment, process 600 module 341 of memory 123 includes file transfer status module 349 that includes procedures, data, and/or instructions for informing sending peer computing system 100 and recipient peer computing system 150 of the status of a requested file transfer.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 discussed herein do not limit the scope as claimed below.

A more detailed discussion of the operation of proxy server system 120, memory 123, and process 600 is provided below with respect to FIG. 6.

Figure 4:
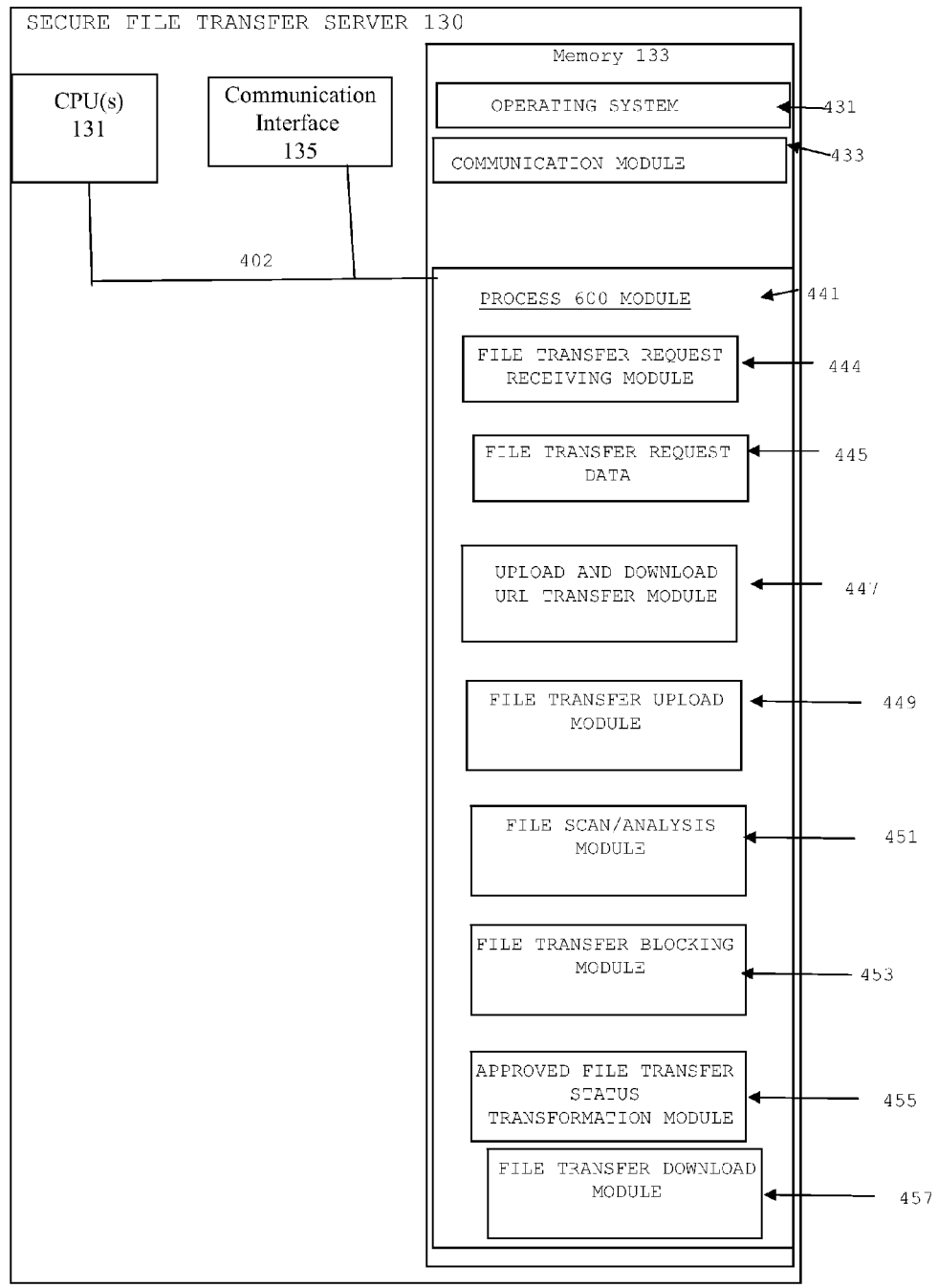
FIG. 4 is a block diagram of the secure file transfer server (SFTS) of FIG. 1, in accordance with one embodiment.

Referring now to FIGS. 1 and 4 together, FIG. 4 is a more detailed block diagram of secure file transfer server 130.

As seen in FIG. 4, secure file transfer server 130 includes CPU(s) 131 coupled to memory 133 and communication interface 135 by bus 402.

As seen in FIG. 4, in one embodiment, memory 133 can store data and/or instructions associated with, but not limited to, the following elements, subsets of elements, and/or supersets of elements, for processing by one or more processors, such as CPUs 101, 121, 131, 151: operating system 431 that includes procedures, data, and/or instructions for handling various services and performing/coordinating hardware dependent tasks; communication module 433 that includes procedures, data, and/or instructions for providing, along with communication interface 135, a data transfer capability between secure file transfer server 130, proxy server system 120, sending peer computing system 100, and recipient peer computing system 150; and process 600 module 441 that includes procedures, data, and/or instructions, for implementing at least part of a process for providing secure peer-to-peer file transfers 600.

As also seen in FIG. 4, in one embodiment, process 600 module 441 of memory 133 includes file transfer request receiving module 444 that includes procedures, data, and/or instructions for receiving a request for a file transfer session from proxy server system 120. As noted above, proxy server system 120 registers a request for a file transfer session with secure file transfer server 130 by making an HTTPS request to secure file transfer server 130.

In one embodiment, as part of the request for a file transfer session, proxy server system 120 transfers data associated with the peers to secure file transfer server 130 as file transfer request data 445. In various embodiments, file transfer request data 445 includes, but not limited to: data identifying the sending peer and/or recipient peer; data indicating an enrollment/protection subscription status the sending peer and/or recipient peer; data indicating the state of the sending peer and/or recipient peer computing systems, and/or transfer request/negotiation messages.

As also seen in FIG. 4, in one embodiment, process 600 module 441 of memory 133 includes upload and download URL transfer module 447 that includes procedures, data, and/or instructions for transmitting upload and download URLs from secure file transfer server 130 to proxy server system 120.

As also seen in FIG. 4, in one embodiment, process 600 module 441 of memory 133 includes file transfer upload module 449 that includes procedures, data, and/or instructions for the selected file for transfer to be uploaded from sending peer computing system 100 to secure file transfer server 130 through the upload URL, and the associated upload webpage As also seen in FIG. 4, in one embodiment, process 600 module 441 of memory 133 includes file scan/analysis module 451 that includes procedures, data, and/or instructions for scanning the selected file to be transferred and/or performing any desired analysis.

As also seen in FIG. 4, in one embodiment, process 600 module 441 of memory 133 includes file transfer blocking module 453 that includes procedures, data, and/or instructions for blocking the request file transfer if the uploaded selected file to be transferred "fails" the scanning and/or analysis of file scan/analysis module 451, e.g., malware such as viruses, spam, or other forms of malicious and/or unwanted content are found in the uploaded selected file.

As also seen in FIG. 4, in one embodiment, process 600 module 441 of memory 133 includes approved transfer file status transformation module 455 that includes procedures, data, and/or instructions for transforming data indicating a status of the uploaded selected file to be transferred to a status of "approved transfer file" if the uploaded selected file to be transferred "passes" the scanning and/or analysis of file scan/analysis module 451, e.g., malware such as viruses, spam, or other forms of malicious and/or unwanted content are not found in the uploaded selected file.

As also seen in FIG. 4, in one embodiment, process 600 module 441 of memory 133 includes file transfer download module 457 that includes procedures, data, and/or instructions for downloading the approved transfer file to recipient peer computing system 150 via the download URL and download webpage.

Those of skill in the art will readily recognize that the choice of components, data, modules, and information shown in FIG. 4, the organization of the components, data, modules, and information shown in FIG. 4, and the manner of storage and location of storage of the data, modules, and information shown in FIG. 4 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 4 are illustrative only and not limiting. In various other embodiments, the particular modules and/or data shown in FIG. 4 can be grouped together in fewer modules and/or data locations or divided among more modules and/or data locations. Consequently, those of skill in the art will recognize that other orders and/or grouping are possible and the particular modules and/or data, order, and/or grouping shown in FIG. 4 discussed herein do not limit the scope as claimed below.

A more detailed discussion of the operation of secure file transfer server 130, memory 133, and process 600 is provided below with respect to FIG. 6.

Figure 5:
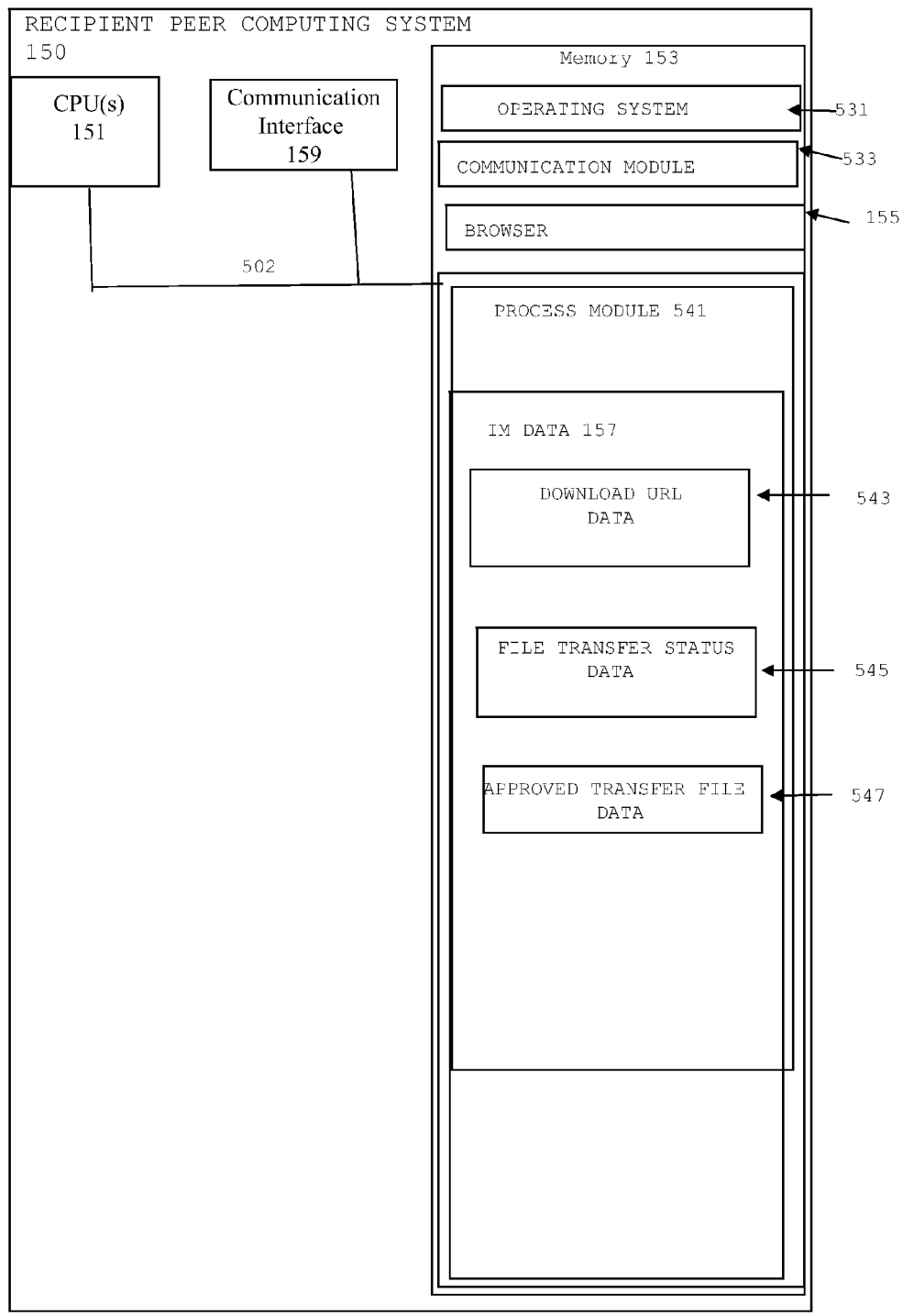
FIG. 5 is a block diagram of the recipient peer computing system of FIG. 1, in accordance with one embodiment.

Referring now to FIGS. 1 and 5 together, FIG. 5 is a more detailed block diagram of recipient peer computing system 150.

As seen in FIG. 5, recipient peer computing system 150 includes CPU(s) 151 coupled to memory 153 and communication interface 159 by bus 502.

As seen in FIG. 5, in one embodiment, memory 153 can store data and/or instructions associated with, but not limited to, the following elements, subsets of elements, and/or supersets of elements for processing by one or more processors, such as CPUs 101, 121, 131, 151: operating system 531 that includes procedures, data, and/or instructions for handling various services and performing/coordinating hardware dependent tasks; communication module 533 that includes procedures, data, and/or instructions for providing, along with communication interface 159, a data transfer capability between recipient peer computing system 150, sending peer computing system 100, and proxy server system 120; browser module 155 that includes procedures, data, and/or instructions for providing one or more web browsers, and/or a web browser capability and providing communication with secure file transfer server 130; process 600 module 541 that includes procedures, data, and/or instructions, for implementing at least part of a process for providing secure peer-to-peer file transfers 600; and IM data 157.

As also seen in FIG. 5, in one embodiment, IM data 157 of memory 153 includes: download URL data 543 representing download URL's and instructions for transferring a file through secure file transfer server 130; file transfer status data 545 representing a message sent to recipient computing system 150 indicating whether a desired file transfer has taken place, is taking place, or has been blocked; and approved transfer file data 547 representing approved transfer file data downloaded to recipient peer computing system 150 via the download URL and download webpage.

Those of skill in the art will readily recognize that the choice of components, data, modules, and information shown in FIG. 5, the organization of the components, data, modules, and information shown in FIG. 5, and the manner of storage and location of storage of the data, modules, and information shown in FIG. 5 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 5 are illustrative only and not limiting. In various other embodiments, the particular modules and/or data shown in FIG. 5 can be grouped together in fewer modules and/or data locations or divided among more modules and/or data locations. Consequently, those of skill in the art will recognize that other orders and/or grouping are possible and the particular modules and/or data, order, and/or grouping shown in FIG. 5 discussed herein do not limit the scope as claimed below.

A more detailed discussion of the operation of recipient peer computing system 150, memory 153, and process 600 is provided below with respect to FIG. 6.

Process

According to one embodiment, a method and system for providing secure peer-to-peer file transfers includes a process for providing secure peer-to-peer file transfers whereby direct file transfer request/negotiation messages sent between a potential sending peer and a potential recipient peer through Instant Messaging (IM), Chat, and other peer-to-peer communication systems, are identified and/or intercepted. In one embodiment, the direct file transfer request/negotiation messages are then blocked, thereby blocking the direct file transfer. In one embodiment, upload and download URL's are then sent to the sending peer and the recipient peer, respectively. In one embodiment, the upload and download URLs direct the sending peer and recipient peer to distinct upload and download webpages where they are able to complete a secure file transfer using a secure file transfer server. In one embodiment, the sending peer then selects and uploads the file to be transferred to the secure file transfer server using the upload URL, and upload webpage. In one embodiment, the uploaded file to be transferred is then scanned for malware, and/or any other desired analysis of the uploaded file is performed. In one embodiment, if the uploaded file to be transferred "fails" the scanning/analysis, the file transfer is blocked and both the sending and recipient peer are informed that the file transfer was blocked. In one embodiment, if the uploaded file to be transferred does "pass" the scanning/analysis, the status of the uploaded file to be transferred is transformed to that of "approved transfer file". In one embodiment, the recipient peer then downloads the approved transfer file using the download URL, and download website. In one embodiment, once the approved transfer file is downloaded by the recipient peer, both the sending and recipient peer are informed that the desired file transfer was completed.

Figure 6:
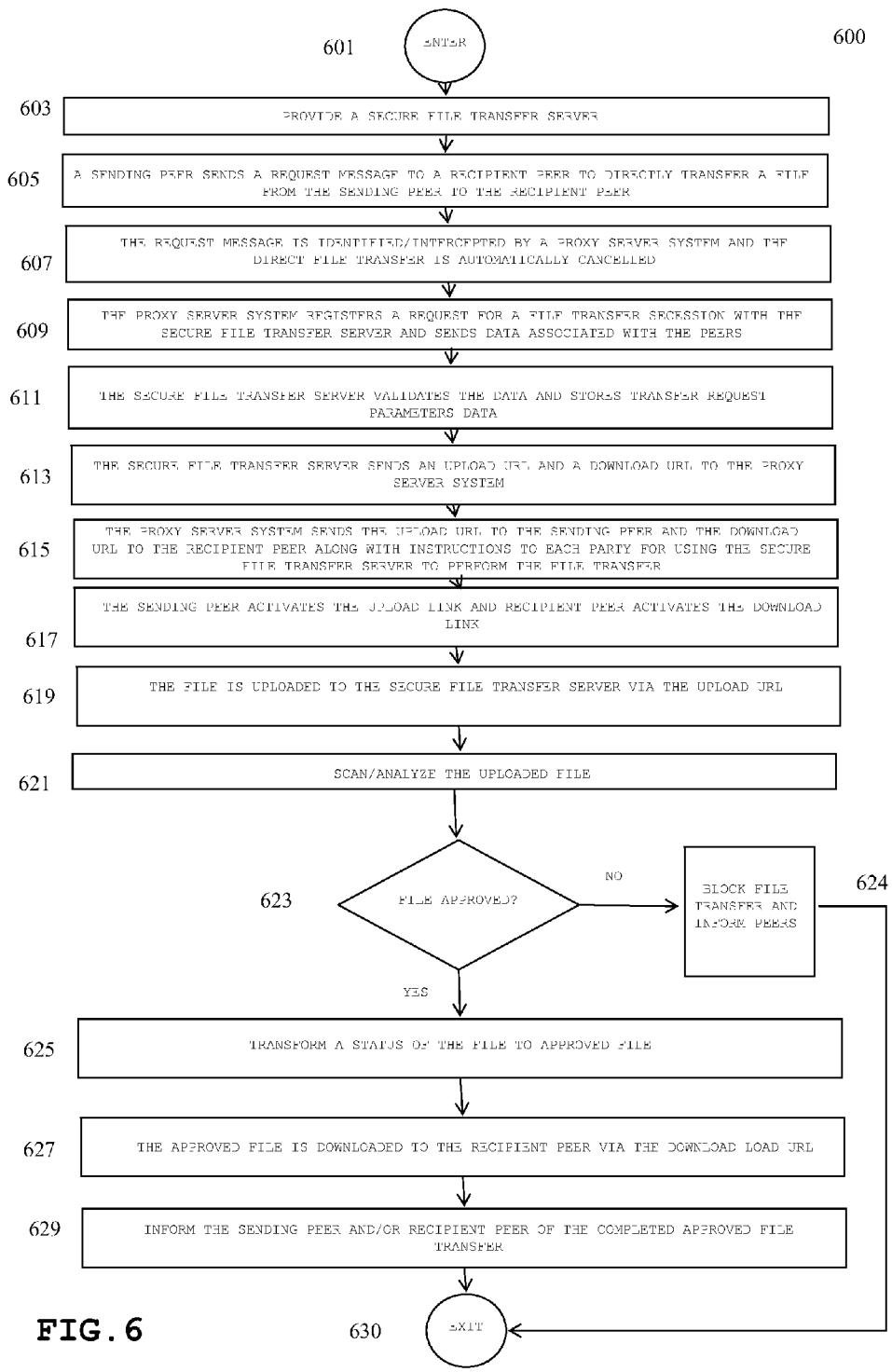
FIG. 6 is a flow chart depicting a process for providing secure peer-to-peer file transfers in accordance with one embodiment.

Referring now to FIGS. 1, 2, 3, 4, 5 and 6 together, FIG. 6 is a flowchart depicting a process for providing secure peer-to-peer file transfers 600 in accordance with one embodiment.

Process for providing secure peer-to-peer file transfers 600 begins at ENTER OPERATION 601 and process flow proceeds to PROVIDE A SECURE FILE TRANSFER SERVER OPERATION 603.

In one embodiment, at PROVIDE A SECURE FILE TRANSFER SERVER OPERATION 603 a secure file transfer server (SFTS) is provided through which a sending peer can perform a secure file transfer to a recipient peer.

In one embodiment, at PROVIDE A SECURE FILE TRANSFER SERVER OPERATION 603 a secure file transfer server (SFTS), such as secure file transfer server 130 of FIGS. 1 and 4, is provided through which a sending peer computing system, such as sending peer computing system 100 of FIGS. 1 and 2, can perform a secure file transfer to a recipient peer computing system, such as recipient peer computing system 150 of FIGS. 1 and 5.

Returning to FIG. 6, in various embodiments, the secure file transfer server of PROVIDE A SECURE FILE TRANSFER SERVER OPERATION 603 can be any computing system as discussed herein, and/or as known in the art at the time of filing, and/or as developed/made available after the time of filing.

In various embodiments, the secure file transfer server of PROVIDE A SECURE FILE TRANSFER SERVER OPERATION 603 can be two or more computing systems and/or two or more secure file transfer servers can be provided.

In one embodiment, the secure file transfer server of PROVIDE A SECURE FILE TRANSFER SERVER OPERATION 603 is in communication with, and/or is otherwise accessible by, one or proxy server systems, such as proxy server system 120 of FIGS. 1 and 3, providing communication between two or more computing systems, such as sending peer computing system 100 of FIGS. 1 and 2, and/or a recipient peer computing system, such as recipient peer computing system 150 of FIGS. 1 and 5, via an Instant Messaging (IM), Chat, and other peer-to-peer communication systems.

As noted above, herein, the term Instant Messaging, or IM, includes any form of "real-time" peer-to-peer communication system as discussed herein, and/or as known in the art at the time of filing, and/or as developed/made available after the time of filing.

Returning to FIG. 6, in one embodiment, the secure file transfer server of PROVIDE A SECURE FILE TRANSFER SERVER OPERATION 603 hosts, and/or is associated with, an HTTP/HTTPS secure file transfer system and one or more upload and download webpages accessed via one or more upload and download URLs.

In one embodiment, once a secure file transfer server (SFTS) is provided through which a sending peer can perform a secure file transfer to a recipient peer at PROVIDE A SECURE FILE TRANSFER SERVER OPERATION 603, process flow proceeds to A SENDING PEER SENDS A REQUEST MESSAGE TO A RECIPIENT PEER TO DIRECTLY TRANSFER A FILE FROM THE SENDING PEER TO THE RECIPIENT PEER OPERATION 605.

In one embodiment, at A SENDING PEER SENDS A REQUEST MESSAGE TO A RECIPIENT PEER TO DIRECTLY TRANSFER A FILE FROM THE SENDING PEER TO THE RECIPIENT PEER OPERATION 605 a direct file transfer request/negotiation message is sent between a potential sending peer and a potential recipient peer through an Instant Messaging (IM) system.

In one embodiment, at A SENDING PEER SENDS A REQUEST MESSAGE TO A RECIPIENT PEER TO DIRECTLY TRANSFER A FILE FROM THE SENDING PEER TO THE RECIPIENT PEER OPERATION 605 a direct file transfer request/negotiation message is sent from a potential sending peer computing system, such as sending peer computing system 100 of FIGS. 1 and 2, to a potential recipient peer computing system, such as recipient peer computing system 150 of FIGS. 1 and 5, through an Instant Messaging (IM) system provided by a proxy server system, such as proxy server system 120 of FIGS. 1 and 3.

In one embodiment, once a direct file transfer request/negotiation message is sent between a potential sending peer and a potential recipient peer through an Instant Messaging (IM) system at A SENDING PEER SENDS A REQUEST MESSAGE TO A RECIPIENT PEER TO DIRECTLY TRANSFER A FILE FROM THE SENDING PEER TO THE RECIPIENT PEER OPERATION 605, process flow proceeds to THE REQUEST MESSAGE IS IDENTIFIED/INTERCEPTED BY A PROXY SERVER SYSTEM AND THE DIRECT FILE TRANSFER IS AUTOMATICALLY CANCELLED OPERATION 607.

As noted above, in one embodiment, the ubiquitous use of request/negotiation message mechanisms by IM services to negotiate file transfers between peers is used to identify/intercept and block direct file transfers. To this end, in one embodiment, when the sending peer sends a request/negotiation message from a sending peer computing system to a recipient peer, and recipient peer computing system, indicating a desire to directly transfer a file to the recipient peer computing system at A SENDING PEER SENDS A REQUEST MESSAGE TO A RECIPIENT PEER TO DIRECTLY TRANSFER A FILE FROM THE SENDING PEER TO THE RECIPIENT PEER OPERATION 605, the request/negotiation message is identified and/or intercepted by the proxy server system at THE REQUEST MESSAGE IS IDENTIFIED/INTERCEPTED BY A PROXY SERVER SYSTEM AND THE DIRECT FILE TRANSFER IS AUTOMATICALLY CANCELLED OPERATION 607. In one embodiment, at THE REQUEST MESSAGE IS IDENTIFIED/INTERCEPTED BY A PROXY SERVER SYSTEM AND THE DIRECT FILE TRANSFER IS AUTOMATICALLY CANCELLED OPERATION 607 the request/negotiation message is then automatically blocked by the proxy server system, thereby blocking the direct file transfer.

In one embodiment, at THE REQUEST MESSAGE IS IDENTIFIED/INTERCEPTED BY A PROXY SERVER SYSTEM AND THE DIRECT FILE TRANSFER IS AUTOMATICALLY CANCELLED OPERATION 607, the request/negotiation message is identified and/or intercepted by a proxy server system, such as proxy server system 120 of FIGS. 1 and 3, under the direction of one or more processors associated with one or more computing systems, such as CPU(s) 101, 121, 131, and 151 of FIG. 1.

Returning to FIG. 6, in one embodiment, at THE REQUEST MESSAGE IS IDENTIFIED/INTERCEPTED BY A PROXY SERVER SYSTEM AND THE DIRECT FILE TRANSFER IS AUTOMATICALLY CANCELLED OPERATION 607, the request/negotiation message is automatically blocked by a proxy server system, such as proxy server system 120 of FIGS. 1 and 3, under the direction of one or more processors associated with one or more computing systems, such as CPU(s) 101, 121, 131, and 151 of FIG. 1.

Returning to FIG. 6, once the request/negotiation message is identified and/or intercepted, and the request/negotiation message is automatically blocked by the proxy server system, thereby blocking the direct file transfer, at THE REQUEST MESSAGE IS IDENTIFIED/INTERCEPTED BY A PROXY SERVER SYSTEM AND THE DIRECT FILE TRANSFER IS AUTOMATICALLY CANCELLED OPERATION 607, process flow proceeds to THE PROXY SERVER SYSTEM REGISTERS A REQUEST FOR A FILE TRANSFER SECESSION WITH THE SECURE FILE TRANSFER SERVER AND SENDS DATA ASSOCIATED WITH THE PEERS OPERATION 609.

In one embodiment, at THE PROXY SERVER SYSTEM REGISTERS A REQUEST FOR A FILE TRANSFER SECESSION WITH THE SECURE FILE TRANSFER SERVER AND SENDS DATA ASSOCIATED WITH THE PEERS OPERATION 609 the proxy server system registers a request for a file transfer session with the secure file transfer server of PROVIDE A SECURE FILE TRANSFER SERVER OPERATION 603.

In one embodiment, at THE PROXY SERVER SYSTEM REGISTERS A REQUEST FOR A FILE TRANSFER SECESSION WITH THE SECURE FILE TRANSFER SERVER AND SENDS DATA ASSOCIATED WITH THE PEERS OPERATION 609 the proxy server system registers a request for a file transfer session with the secure file transfer server of PROVIDE A SECURE FILE TRANSFER SERVER OPERATION 603 by making an HTTPS request to the secure file transfer server.

In one embodiment, as part of the request for a file transfer session of THE PROXY SERVER SYSTEM REGISTERS A REQUEST FOR A FILE TRANSFER SECESSION WITH THE SECURE FILE TRANSFER SERVER AND SENDS DATA ASSOCIATED WITH THE PEERS OPERATION 609, the proxy server system transfers data associated with the peers to the secure file transfer server.

In various embodiments, at THE PROXY SERVER SYSTEM REGISTERS A REQUEST FOR A FILE TRANSFER SECESSION WITH THE SECURE FILE TRANSFER SERVER AND SENDS DATA ASSOCIATED WITH THE PEERS OPERATION 609 the proxy server system transfers data associated with the peers to the secure file transfer server including, but not limited to: data identifying the sending peer and/or recipient peer; data indicating an enrollment/protection subscription status the sending peer and/or recipient peer; data indicating the state of the sending peer and/or recipient peer computing systems and/or any transfer request/negotiation messages.

In one embodiment, once the proxy server system registers a request for a file transfer session with the secure file transfer server of PROVIDE A SECURE FILE TRANSFER SERVER OPERATION 603 at THE PROXY SERVER SYSTEM REGISTERS A REQUEST FOR A FILE TRANSFER SECESSION WITH THE SECURE FILE TRANSFER SERVER AND SENDS DATA ASSOCIATED WITH THE PEERS OPERATION 609, process flow proceeds to THE SECURE FILE TRANSFER SERVER VALIDATES THE DATA AND STORES TRANSFER REQUEST PARAMETERS DATA OPERATION 611.

In one embodiment, at THE SECURE FILE TRANSFER SERVER VALIDATES THE DATA AND STORES TRANSFER REQUEST PARAMETERS DATA OPERATION 611 the secure file transfer server of PROVIDE A SECURE FILE TRANSFER SERVER OPERATION 603 validates the data associated with the peers of THE PROXY SERVER REGISTERS A REQUEST FOR A FILE TRANSFER SECESSION WITH THE SECURE FILE TRANSFER SERVER AND SENDS DATA ASSOCIATED WITH THE PEERS OPERATION 609 and stores the request parameter data.

In one embodiment, at THE SECURE FILE TRANSFER SERVER VALIDATES THE DATA AND STORES TRANSFER REQUEST PARAMETERS DATA OPERATION 611 the secure file transfer server of PROVIDE A SECURE FILE TRANSFER SERVER OPERATION 603 validates the data associated with the peers of THE PROXY SERVER REGISTERS A REQUEST FOR A FILE TRANSFER SECESSION WITH THE SECURE FILE TRANSFER SERVER AND SENDS DATA ASSOCIATED WITH THE PEERS OPERATION 609 and stores the request parameter data as part of file transfer request data 445 of FIG. 4.

Returning to FIG. 6, in one embodiment, at THE SECURE FILE TRANSFER SERVER VALIDATES THE DATA AND STORES TRANSFER REQUEST PARAMETERS DATA OPERATION 611 the secure file transfer server of PROVIDE A SECURE FILE TRANSFER SERVER OPERATION 603 validates the data associated with the peers of THE PROXY SERVER REGISTERS A REQUEST FOR A FILE TRANSFER SECESSION WITH THE SECURE FILE TRANSFER SERVER AND SENDS DATA ASSOCIATED WITH THE PEERS OPERATION 609 and stores the request parameter data under the direction of one or more processors associated with one or more computing systems, such as CPU(s) 101, 121, 131, and 151 of FIG. 1.

Returning to FIG. 6, in one embodiment, once the secure file transfer server of PROVIDE A SECURE FILE TRANSFER SERVER OPERATION 603 validates the data associated with the peers of THE PROXY SERVER REGISTERS A REQUEST FOR A FILE TRANSFER SECESSION WITH THE SECURE FILE TRANSFER SERVER AND SENDS DATA ASSOCIATED WITH THE PEERS OPERATION 609 and stores the request parameter data at THE SECURE FILE TRANSFER SERVER VALIDATES THE DATA AND STORES TRANSFER REQUEST PARAMETERS DATA OPERATION 611, process flow proceeds to THE SECURE FILE TRANSFER SERVER SENDS AN UPLOAD URL AND A DOWNLOAD URL TO THE PROXY SERVER SYSTEM OPERATION 613.

In one embodiment, at THE SECURE FILE TRANSFER SERVER SENDS AN UPLOAD URL AND A DOWNLOAD URL TO THE PROXY SERVER SYSTEM OPERATION 613 the secure file transfer server of PROVIDE A SECURE FILE TRANSFER SERVER OPERATION 603 sends an upload URL and a download URL to the proxy server system.

In one embodiment, at THE SECURE FILE TRANSFER SERVER SENDS AN UPLOAD URL AND A DOWNLOAD URL TO THE PROXY SERVER SYSTEM OPERATION 613 the secure file transfer server of PROVIDE A SECURE FILE TRANSFER SERVER OPERATION 603 sends data representing an upload URL and a download URL from a upload and download URL transfer module, such as upload and download URL transfer module 447 of FIG. 4, associated with a secure file transfer server, such as secure file transfer server 130 of FIGS. 1 and 4, to a upload and download URL processing module, such as upload and download URL processing module 347 of FIG. 3, associated with a proxy server system, such as proxy server system 120 of FIGS. 1 and 3.

In one embodiment, at THE SECURE FILE TRANSFER SERVER SENDS AN UPLOAD URL AND A DOWNLOAD URL TO THE PROXY SERVER SYSTEM OPERATION 613, the upload URL and the download URL link to distinct upload webpages and download webpages hosted by the secure file transfer server.

In one embodiment, once a request for a file transfer session has been registered with the secure file transfer server at THE SECURE FILE TRANSFER SERVER VALIDATES THE DATA AND STORES TRANSFER REQUEST PARAMETERS DATA OPERATION 611, and/or the upload URL and the download URL have been transferred to the proxy server system at THE SECURE FILE TRANSFER SERVER SENDS AN UPLOAD URL AND A DOWNLOAD URL TO THE PROXY SERVER SYSTEM OPERATION 613, the file transfer must be initiated within a configurable/defined amount of time, or else the request will be automatically cancelled.

In one embodiment, once the secure file transfer server of PROVIDE A SECURE FILE TRANSFER SERVER OPERATION 603 sends an upload URL and a download URL to the proxy server system at THE SECURE FILE TRANSFER SERVER SENDS AN UPLOAD URL AND A DOWNLOAD URL TO THE PROXY SERVER SYSTEM OPERATION 613, process flow proceeds to THE PROXY SERVER SYSTEM SENDS THE UPLOAD URL TO THE SENDING PEER AND THE DOWNLOAD URL TO THE RECIPIENT PEER ALONG WITH INSTRUCTIONS TO EACH PARTY FOR USING THE SECURE FILE TRANSFER SERVER TO PERFORM THE FILE TRANSFER OPERATION 615.

In one embodiment, at THE PROXY SERVER SYSTEM SENDS THE UPLOAD URL TO THE SENDING PEER AND THE DOWNLOAD URL TO THE RECIPIENT PEER ALONG WITH INSTRUCTIONS TO EACH PARTY FOR USING THE SECURE FILE TRANSFER SERVER TO PERFORM THE FILE TRANSFER OPERATION 615 the proxy server system sends a message to the sending peer computing system that includes the upload URL and directions for using the secure file transfer server for the file transfer, and a message to the recipient peer computing system that includes the download URL and directions for using the secure file transfer server for the file transfer.

In one embodiment, at THE PROXY SERVER SYSTEM SENDS THE UPLOAD URL TO THE SENDING PEER AND THE DOWNLOAD URL TO THE RECIPIENT PEER ALONG WITH INSTRUCTIONS TO EACH PARTY FOR USING THE SECURE FILE TRANSFER SERVER TO PERFORM THE FILE TRANSFER OPERATION 615 the proxy server system sends a message to the sending peer computing system through the IM system provided by the proxy server that includes the upload URL and directions for using the secure file transfer server for the file transfer, and a message to the recipient peer computing system through the IM system provided by the proxy server that includes the download URL and directions for using the secure file transfer server for the file transfer.

In one embodiment, at THE PROXY SERVER SYSTEM SENDS THE UPLOAD URL TO THE SENDING PEER AND THE DOWNLOAD URL TO THE RECIPIENT PEER ALONG WITH INSTRUCTIONS TO EACH PARTY FOR USING THE SECURE FILE TRANSFER SERVER TO PERFORM THE FILE TRANSFER OPERATION 615 a proxy server system, such as proxy server system 120 of FIGS. 1 and 3, sends data to the sending peer computing system, such as sending computing system 100 of FIGS. 1 and 2, that includes the upload URL and directions for using the secure file transfer server for the file transfer, such as upload URL data 247 of FIG. 2, and data, such as download URL data 543 of FIG. 5, to the recipient peer computing system, such as recipient peer computing system 150 of FIGS. 1 and 5, that includes the download URL and directions for using the secure file transfer server for the file transfer.

As noted above, in one embodiment, the upload URL and the download URL of THE PROXY SERVER SYSTEM SENDS THE UPLOAD URL TO THE SENDING PEER AND THE DOWNLOAD URL TO THE RECIPIENT PEER ALONG WITH INSTRUCTIONS TO EACH PARTY FOR USING THE SECURE FILE TRANSFER SERVER TO PERFORM THE FILE TRANSFER OPERATION 615 link to distinct upload webpages and download webpages hosted by the secure file transfer server.

In one embodiment, once the proxy server system sends a message to the sending peer computing system that includes the upload URL and directions for using the secure file transfer server for the file transfer, and a message to the recipient peer computing system that includes the download URL and directions for using the secure file transfer server for the file transfer at THE PROXY SERVER SYSTEM SENDS THE UPLOAD URL TO THE SENDING PEER AND THE DOWNLOAD URL TO THE RECIPIENT PEER ALONG WITH INSTRUCTIONS TO EACH PARTY FOR USING THE SECURE FILE TRANSFER SERVER TO PERFORM THE FILE TRANSFER OPERATION 615, process flow proceeds to THE SENDING PEER ACTIVATES THE UPLOAD LINK AND RECIPIENT PEER ACTIVATES THE DOWNLOAD LINK OPERATION 617.

In one embodiment, at THE SENDING PEER ACTIVATES THE UPLOAD LINK AND RECIPIENT PEER ACTIVATES THE DOWNLOAD LINK OPERATION 617 the sending peer and the recipient peer click, or otherwise activate, their respective upload and download URLs of THE PROXY SERVER SYSTEM SENDS THE UPLOAD URL TO THE SENDING PEER AND THE DOWNLOAD URL TO THE RECIPIENT PEER ALONG WITH INSTRUCTIONS TO EACH PARTY FOR USING THE SECURE FILE TRANSFER SERVER TO PERFORM THE FILE TRANSFER OPERATION 615 and access their respective upload and download webpages.

In one embodiment, at THE SENDING PEER ACTIVATES THE UPLOAD LINK AND RECIPIENT PEER ACTIVATES THE DOWNLOAD LINK OPERATION 617 the sending peer and the recipient peer access their respective upload and download webpages via their respective web browsers, such as browsers 105 and 155, respectively, running on their respective sending peer and recipient peer computing systems, 100 and 150, respectively, using one or more user interface devices such as a keyboard, a mouse, a touchpad, voice recognition systems, or any other means, mechanism, process, and/or procedure for converting user actions into computing system instructions.

Returning to FIG. 6, in one embodiment, once the sending peer and the recipient peer click, or otherwise activate, their respective upload and download URLs of THE PROXY SERVER SYSTEM SENDS THE UPLOAD URL TO THE SENDING PEER AND THE DOWNLOAD URL TO THE RECIPIENT PEER ALONG WITH INSTRUCTIONS TO EACH PARTY FOR USING THE SECURE FILE TRANSFER SERVER TO PERFORM THE FILE TRANSFER OPERATION 615 and access their respective upload and download webpages at THE SENDING PEER ACTIVATES THE UPLOAD LINK AND RECIPIENT PEER ACTIVATES THE DOWNLOAD LINK OPERATION 617, process flow proceeds to THE FILE IS UPLOADED TO THE SECURE FILE TRANSFER SERVER VIA THE UPLOAD URL OPERATION 619.

In one embodiment, at THE FILE IS UPLOADED TO THE SECURE FILE TRANSFER SERVER VIA THE UPLOAD URL OPERATION 619 the sending peer selects and initiates the upload of the file to be transferred to the secure file transfer server using the upload URL, and upload webpage, of THE PROXY SERVER SENDS THE UPLOAD URL TO THE SENDING PEER AND THE DOWNLOAD URL TO THE RECIPIENT PEER ALONG WITH INSTRUCTIONS TO EACH PARTY FOR USING THE SECURE FILE TRANSFER SERVER TO PERFORM THE FILE TRANSFER OPERATION 615.

In one embodiment, at THE FILE IS UPLOADED TO THE SECURE FILE TRANSFER SERVER VIA THE UPLOAD URL OPERATION 619 the sending peer selects the file to be transferred from a data store associated with the sending peer computing system. In one embodiment, at THE FILE IS UPLOADED TO THE SECURE FILE TRANSFER SERVER VIA THE UPLOAD URL OPERATION 619 the sending peer party selects the file to be transferred from a data store associated with the sending peer computing system and begins the transfer process via a "drag and drop" operation.

In one embodiment, once the sending peer selects the file to be transferred at THE FILE IS UPLOADED TO THE SECURE FILE TRANSFER SERVER VIA THE UPLOAD URL OPERATION 619, the upload of the selected file to the secure file transfer server is begun through the upload URL, and the associated upload webpage, of THE PROXY SERVER SENDS THE UPLOAD URL TO THE SENDING PEER AND THE DOWNLOAD URL TO THE RECIPIENT PEER ALONG WITH INSTRUCTIONS TO EACH PARTY FOR USING THE SECURE FILE TRANSFER SERVER TO PERFORM THE FILE TRANSFER OPERATION 615.

In one embodiment, as the selected file to be transferred is being uploaded to the secure file transfer server at THE FILE IS UPLOADED TO THE SECURE FILE TRANSFER SERVER VIA THE UPLOAD URL OPERATION 619, the upload progress is displayed to both the sending peer computing system and recipient peer computing system, in one embodiment by providing an upload progress bar on the respective browsers running on the sending peer computing system and recipient peer computing system.

In one embodiment, once the sending peer and the recipient peer click, or otherwise activate, their respective upload and download URLs, and the sending peer selects the file to be transferred to the secure file transfer server at THE FILE IS UPLOADED TO THE SECURE FILE TRANSFER SERVER VIA THE UPLOAD URL OPERATION 619, the file transfer begins automatically. In another embodiment, a second authentication factor is used to identify the peers to provide greater security. As a specific example, in embodiments were a public IM system is used, a second authentication factor such as OpenID™, available at http://openid.net/, is used.

In one embodiment, once the sending peer selects and initiates the upload of the file to be transferred to the secure file transfer server using the upload URL, and upload webpage, of THE PROXY SERVER SENDS THE UPLOAD URL TO THE SENDING PEER AND THE DOWNLOAD URL TO THE RECIPIENT PEER ALONG WITH INSTRUCTIONS TO EACH PARTY FOR USING THE SECURE FILE TRANSFER SERVER TO PERFORM THE FILE TRANSFER OPERATION 615 at THE FILE IS UPLOADED TO THE SECURE FILE TRANSFER SERVER VIA THE UPLOAD URL OPERATION 619, process flow proceeds to SCAN/ANALYZE THE UPLOADED FILE OPERATION 621.

In one embodiment, at SCAN/ANALYZE THE UPLOADED FILE OPERATION 621 the uploaded file to be transferred of THE FILE IS UPLOADED TO THE SECURE FILE TRANSFER SERVER VIA THE UPLOAD URL OPERATION 619 is scanned for malware, and/or any other desired analysis of the uploaded file is performed.

In one embodiment, once the selected file to be transferred is completely uploaded to the secure file transfer server at THE FILE IS UPLOADED TO THE SECURE FILE TRANSFER SERVER VIA THE UPLOAD URL OPERATION 619, the uploaded file to be transferred is scanned, and/or any desired analysis is performed at SCAN/ANALYZE THE UPLOADED FILE OPERATION 621 under the direction of one or more processors associated with one or more computing systems, such as CPU(s) 101, 121, 131, 151, of FIG. 1.

Returning the FIG. 6, in one embodiment, at SCAN/ANALYZE THE UPLOADED FILE OPERATION 621 the uploaded file to be transferred is scanned for malware such as viruses, spam, or other forms of malicious and/or unwanted content. In one embodiment, the uploaded file to be transferred is scanned for malware such as viruses, spam, or other forms of malicious and/or unwanted content using one or more security systems as discussed herein, and/or as known in the art at the time of filing, and/or as developed/made available after the time of filing.

Numerous methods, means, processes, procedures, and systems for scanning files and data for malware such as viruses, spam, or other forms of malicious and/or unwanted content are known in the art. Consequently, a more detailed discussion of particular methods, means, processes, procedures, and systems for scanning files and data for malware such as viruses, spam, or other forms of malicious and/or unwanted content are omitted here to avoid detracting from the invention.

In one embodiment, once the uploaded file to be transferred of THE FILE IS UPLOADED TO THE SECURE FILE TRANSFER SERVER VIA THE UPLOAD URL OPERATION 619 is scanned for malware, and/or any other desired analysis of the uploaded file is performed, at SCAN/ANALYZE THE UPLOADED FILE OPERATION 621, process flow proceeds to FILE APPROVED? OPERATION 623.

In one embodiment, at FILE APPROVED? OPERATION 623 a determination is made as to whether the uploaded file to be transferred of THE FILE IS UPLOADED TO THE SECURE FILE TRANSFER SERVER VIA THE UPLOAD URL OPERATION 619 "passes" or "fails" the scanning and/or other analysis of SCAN/ANALYZE THE UPLOADED FILE OPERATION 621.

In one embodiment, if a determination is made at FILE APPROVED? OPERATION 623 that the uploaded file to be transferred of THE FILE IS UPLOADED TO THE SECURE FILE TRANSFER SERVER VIA THE UPLOAD URL OPERATION 619 "fails" the scanning and/or analysis of SCAN/ANALYZE THE UPLOADED FILE OPERATION 621, e.g., malware such as viruses, spam, or other forms of malicious and/or unwanted content are found in the uploaded selected file at SCAN/ANALYZE THE UPLOADED FILE OPERATION 621, then the transfer of selected file is blocked and both the sending peer computing system and recipient peer computing system are sent messages indicating that the file transfer has been blocked at BLOCK FILE TRANSFER AND INFORM PEERS OPERATION 624.

In one embodiment, once a determination is made at FILE APPROVED? OPERATION 623 that the uploaded file to be transferred of THE FILE IS UPLOADED TO THE SECURE FILE TRANSFER SERVER VIA THE UPLOAD URL OPERATION 619 "fails" the scanning and/or analysis of SCAN/ANALYZE THE UPLOADED FILE OPERATION 621, and the transfer of uploaded file is blocked, and both the sending peer computing system and recipient peer computing system are sent messages indicating that the file transfer has been blocked at BLOCK FILE TRANSFER AND INFORM PEERS OPERATION 624, process flow proceeds to EXIT OPERATION 630. In one embodiment, at EXIT OPERATION 630 process for providing secure peer-to-peer file transfers 600 is exited to await a new request/negotiation message.

On the other hand, in one embodiment, if a determination is made at FILE APPROVED? OPERATION 623 that the uploaded file to be transferred of THE FILE IS UPLOADED TO THE SECURE FILE TRANSFER SERVER VIA THE UPLOAD URL OPERATION 619 "passes" the scanning and/or analysis of SCAN/ANALYZE THE UPLOADED FILE OPERATION 621, e.g., malware such as viruses, spam, or other forms of malicious and/or unwanted content are not found in the uploaded selected file at SCAN/ANALYZE THE UPLOADED FILE OPERATION 621, then process flow proceeds to TRANSFORM A STATUS OF THE FILE TO APPROVED FILE OPERATION 625.

In one embodiment, at TRANSFORM A STATUS OF THE FILE TO APPROVED FILE OPERATION 625 a status of the uploaded file to be transferred that was determined to "pass" the scanning/analysis of SCAN/ANALYZE THE UPLOADED FILE OPERATION 621 at FILE APPROVED? OPERATION 623, is transformed to the status of "approved transfer file".

In one embodiment, at TRANSFORM A STATUS OF THE FILE TO APPROVED FILE OPERATION 625 data indicating the status of the uploaded file to be transferred that was determined to "pass" the scanning/analysis of SCAN/ANALYZE THE UPLOADED FILE OPERATION 621 at FILE APPROVED? OPERATION 623, is transformed to data indicating a status of "approved transfer file" under the direction of one or more processors associated with one or more computing systems, such as CPU(s) 101, 121, 131, 151, of FIG. 1.

Returning to FIG. 6, in one embodiment, once a status of the uploaded file to be transferred that was determined to "pass" the scanning/analysis of SCAN/ANALYZE THE UPLOADED FILE OPERATION 621 at FILE APPROVED? OPERATION 623, is transformed to the status of "approved transfer file" at TRANSFORM A STATUS OF THE FILE TO APPROVED FILE OPERATION 625, process flow proceeds to THE APPROVED FILE IS DOWNLOADED TO THE RECIPIENT PEER VIA THE DOWNLOAD LOAD URL OPERATION 627.

In one embodiment, at THE APPROVED FILE IS DOWNLOADED TO THE RECIPIENT PEER VIA THE DOWNLOAD LOAD URL OPERATION 627 the now approved transfer file of TRANSFORM A STATUS OF THE FILE TO APPROVED FILE OPERATION 625 is made available for transfer to the recipient peer computing system and the recipient peer downloads the approved transfer file using the download URL, and download website, of THE PROXY SERVER SENDS THE UPLOAD URL TO THE SENDING PEER AND THE DOWNLOAD URL TO THE RECIPIENT PEER ALONG WITH INSTRUCTIONS TO EACH PARTY FOR USING THE SECURE FILE TRANSFER SERVER TO PERFORM THE FILE TRANSFER OPERATION 615.

In one embodiment, at THE APPROVED FILE IS DOWNLOADED TO THE RECIPIENT PEER VIA THE DOWNLOAD LOAD URL OPERATION 627 the approved transfer file of TRANSFORM A STATUS OF THE FILE TO APPROVED FILE OPERATION 625 is downloaded to the recipient peer computing system automatically so long as the downloaded URL remains activated on the recipient peer computing system.

In one embodiment, as the approved transfer file is downloaded to the recipient peer computing system at THE APPROVED FILE IS DOWNLOADED TO THE RECIPIENT PEER VIA THE DOWNLOAD LOAD URL OPERATION 627, the sending peer's upload page/browser displays a new status bar to track the download.

In one embodiment, as the approved transfer file is downloaded to the recipient peer computing system at THE APPROVED FILE IS DOWNLOADED TO THE RECIPIENT PEER VIA THE DOWNLOAD LOAD URL OPERATION 627 the recipient peer's download page/browser also displays a native progress bar to track the download, typically in a dialog box.

In one embodiment, once the approved transfer file of TRANSFORM A STATUS OF THE FILE TO APPROVED FILE OPERATION 625 is made available for transfer to the recipient peer computing system and the recipient peer downloads the approved transfer file using the download URL, and download website, at THE APPROVED FILE IS DOWNLOADED TO THE RECIPIENT PEER VIA THE DOWNLOAD LOAD URL OPERATION 627, process flow proceeds to INFORM THE SENDING PEER AND/OR RECIPIENT PEER OF THE COMPLETED APPROVED FILE TRANSFER OPERATION 629.

In one embodiment, once the approved transfer file is downloaded by the recipient peer, at INFORM THE SENDING PEER AND/OR RECIPIENT PEER OF THE COMPLETED APPROVED FILE TRANSFER OPERATION 629 both the sending and recipient peer are informed that the desired file transfer was completed.

In one embodiment, at INFORM THE SENDING PEER AND/OR RECIPIENT PEER OF THE COMPLETED APPROVED FILE TRANSFER OPERATION 629 upon completion of the download of the approved transfer file to the recipient peer computing system, a message is sent to both the sending peer and the recipient peer from the proxy server system indicating that the approved transfer file download has finished.

In one embodiment, once both the sending and recipient peer are informed that the desired file transfer was completed at INFORM THE SENDING PEER AND/OR RECIPIENT PEER OF THE COMPLETED APPROVED FILE TRANSFER OPERATION 629, process flow proceeds to EXIT OPERATION 630. In one embodiment, at EXIT OPERATION 630 process for providing secure peer-to-peer file transfers 600 is exited to await a new request/negotiation message.

Using process for providing secure peer-to-peer file transfers 600, the ubiquitous use of request/negotiation message mechanisms by IM services to negotiate file transfers between peers is used to identify/intercept, and block, direct file transfers. The request/negotiation messages are then replaced with messages sent to both peers that include upload and download URL links through which the file can be uploaded, scanned analyzed, and then transferred, via a secure file transfer server. Consequently, using process for providing secure peer-to-peer file transfers 600, IM file transfer transactions are provided protection from malware, and provided additional data security, so that IM users can utilize this important capability without taking unacceptable risks.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Herein, embodiments have been discussed with reference to the accompanying FIG.s, which depict one or more exemplary embodiments. The above description includes reference to specific embodiments for illustrative purposes. However, the illustrative discussion above is not intended to be exhaustive or to limit the invention to the precise forms disclosed. Many modifications and variations are possible in view of the teachings below. The embodiments discussed above were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below. In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "analyzing", "accessing", "activating", "calculating", "capturing", "classifying", "comparing", "defining", "detecting", "determining", "distributing", "downloading", "encrypting", "extracting", "filtering", "generating", "identifying", "implementing", "intercepting", "monitoring", "obtaining", "processing", "providing", "receiving", "requesting", "saving", "scanning", "sending", "storing", "transferring", "transforming", "uploading", "using", "validating", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicably coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for providing secure peer-to-peer file transfers comprising:
   using one or more processors at a proxy server to intercept a file transfer request/negotiation communication sent between a sending peer computing system and a recipient peer computing system via a peer-to-peer communication system;
   using one or more processors at the proxy server to block a direct file transfer associated with the file transfer request/negotiation communication; and
   using one or more processors at at least the proxy server to redirect the sending peer computing system and the recipient peer computing system to a secure file transfer server to perform the file transfer;
   wherein the proxy server communicates directly with the sending peer computing system and the recipient peer computing system, wherein the secure file transfer server communicates directly with the sending peer computing system and the recipient peer computing system, and the proxy server is different from and communicates directly with the secure file transfer server.

2. The computing system implemented process for providing secure peer-to-peer file transfers of claim 1 wherein the peer-to-peer communication system is an Instant Messaging (IM) system.

3. The computing system implemented process for providing secure peer-to-peer file transfers of claim 1 wherein using one or more processors to redirect the sending peer computing system and the recipient peer computing system to the secure file transfer server to perform the file transfer includes:
   using one or more processors to provide the sending peer computing system the capability to upload the file to be transferred to the secure file transfer server via an upload webpage;
   using one or more processors to analyze the uploaded file to detect malware within the uploaded file;
   if malware is detected in the uploaded file, using one or more processors to block the transfer of the uploaded file;
   if no malware is detected in the uploaded file, using one or more processors to transform data indicating a status of the uploaded file to a status of approved transfer file; and
   using one or more processors to provide the recipient peer computing system the capability to download the approved transfer file from the secure file transfer server via a download webpage.

4. The computing system implemented process for providing secure peer-to-peer file transfers of claim 3 wherein the upload webpage and the download webpage are different webpages accessed via different upload and download URLs.

5. The computing system implemented process for providing secure peer-to-peer file transfers of claim 3 wherein the peer-to-peer communication system is provided using a proxy server system, further wherein the proxy server system registers a file transfer request with the secure file transfer server and the secure file transfer server provides an upload URL linking to the upload webpage and a download URL linking to the download webpage to the proxy server system, further wherein the proxy server system provides the upload URL linking to the upload webpage to the sending peer computing system and the download URL linking to the download webpage to the recipient peer computing system.

6. The computing system implemented process for providing secure peer-to-peer file transfers of claim 5 wherein the proxy server system registers a file transfer request with the secure file transfer server that is an HTTPS request.

7. The computing system implemented process for providing secure peer-to-peer file transfers of claim 3 wherein the sending peer computing system and the recipient peer computing system are provided data indicating if the file transfer was blocked or if the file transfer was completed.

8. A system for providing secure peer-to-peer file transfers comprising:
   a sending peer computing system, the sending peer computing system being accessible by a sending peer party, the sending peer party desiring to send a transfer file to a recipient peer party;
   a recipient peer computing system, the recipient peer computing system being accessible by a recipient peer party, the recipient peer party desiring to receive the transfer file from the sending peer party;
   a proxy server, the proxy server being associated with a peer-to-peer communication system, the peer-to-peer communication system being used to provide communication between the sending peer computing system and the recipient peer computing system;
   a secure file transfer server, the secure file transfer server being accessible by the proxy server; and
   one or more processors associated with one or more computing systems, the one or more processors associated with one or more computing systems implementing a process for providing secure peer-to-peer file transfers, the process for providing secure peer-to-peer file transfers including:
      using the one or more processors associated with one or more computing systems and the proxy server to intercept a file transfer request/negotiation communication sent between the sending peer computing system and the recipient peer computing system via the peer-to-peer communication system, the request/negotiation communication indicating a desire to directly transfer the transfer file from the sending peer computing system to the recipient peer computing system;
      using the one or more processors associated with one or more computing systems and the proxy server to block the direct transfer of transfer file from the sending peer computing system to the recipient peer computing system; and
      using the one or more processors associated with one or more computing systems and at least the proxy server to redirect the sending peer computing system and the recipient peer computing system to the secure file transfer server to perform the transfer of the transfer file;
   wherein the proxy server communicates directly with the sending peer computing system and the recipient peer computing system, wherein the secure file transfer server communicates directly with the sending peer computing system and the recipient peer computing system, and the proxy server is different from and communicates directly with the secure file transfer server.

9. The system for providing secure peer-to-peer file transfers of claim 8 wherein the peer-to-peer communication system is an Instant Messaging (IM) system.

10. The system for providing secure peer-to-peer file transfers of claim 8 wherein using the one or more processors associated with one or more computing systems to redirect the sending peer computing system and the recipient peer computing system to the secure file transfer server to perform the transfer of the transfer file includes:
   using the one or more processors associated with one or more computing systems to provide the sending peer computing system the capability to upload the file to be transferred to the secure file transfer server via an upload webpage;
   using the one or more processors associated with one or more computing systems to analyze the uploaded file to detect malware within the uploaded file;
   if malware is detected in the uploaded file, using the one or more processors associated with one or more computing systems to block the transfer of the uploaded file;
   if no malware is detected in the uploaded file, using the one or more processors associated with one or more computing systems to transform data indicating a status of the uploaded file to a status of approved transfer file; and
   using the one or more processors associated with one or more computing systems to provide the recipient peer computing system the capability to download the approved transfer file from the secure file transfer server via a download webpage.

11. The system for providing secure peer-to-peer file transfers of claim 10 wherein the upload webpage and the download webpage are different webpages accessed via different upload and download URLs.

12. The system for providing secure peer-to-peer file transfers of claim 10 wherein the proxy server system registers a file transfer request with the secure file transfer server and the secure file transfer server provides an upload URL linking to the upload webpage and a download URL linking to the download webpage to the proxy server system, further wherein the proxy server system provides the upload URL linking to the upload webpage to the sending peer computing system and the download URL linking to the download webpage to the recipient peer computing system.

13. The system for providing secure peer-to-peer file transfers of claim 12 wherein the proxy server system registers a file transfer request with the secure file transfer server that is an HTTPS request.

14. The system for providing secure peer-to-peer file transfers of claim 10 wherein the sending peer computing system and recipient peer computing system are provided data indicating if the file transfer was blocked or if the file transfer was completed.

15. A method for providing secure peer-to-peer file transfers comprising:
   providing a secure file transfer server and a proxy server;
   intercepting, using the proxy server, a file transfer request/negotiation communication sent between a sending peer computing system and a recipient peer computing system via a peer-to-peer communication system;
   blocking, using the proxy server, a direct file transfer associated with the file transfer request/negotiation communication; and
   redirecting, using at least the proxy server, the sending peer computing system and the recipient peer computing system to the secure file transfer server to perform the file transfer;
   wherein the proxy server communicates directly with the sending peer computing system and the recipient peer computing system, wherein the secure file transfer server communicates directly with the sending peer computing system and the recipient peer computing system, and the proxy server is different from and communicates directly with the secure file transfer server.

16. The method for providing secure peer-to-peer file transfers of claim 15 wherein the peer-to-peer communication system is an Instant Messaging (IM) system.

17. The method for providing secure peer-to-peer file transfers of claim 15 wherein redirecting the sending peer computing system and the recipient peer computing system to the secure file transfer server to perform the file transfer includes:
   providing the sending peer computing system the capability to upload the file to be transferred to the secure file transfer server via an upload webpage;
   analyzing the uploaded file to detect malware within the uploaded file;
   if malware is detected in the uploaded file, blocking the transfer of the uploaded file;
   if no malware is detected in the uploaded file, transforming a status of the uploaded file to a status of approved transfer file; and
   providing the recipient peer computing system the capability to download the approved transfer file from the secure file transfer server via a download webpage.

18. The method for providing secure peer-to-peer file transfers of claim 17 wherein the upload webpage and the download webpage are different webpages accessed via different upload and download URLs.

19. The method for providing secure peer-to-peer file transfers of claim 17 wherein the peer-to-peer communication system is provided using a proxy server system, further wherein the proxy server system registers a file transfer request with the secure file transfer server and the secure file transfer server provides an upload URL linking to the upload webpage and a download URL linking to the download webpage to the proxy server system, further wherein the proxy server system provides the upload URL linking to the upload webpage to the sending peer computing system and the download URL linking to the download webpage to the recipient peer computing system.

20. The method for providing secure peer-to-peer file transfers of claim 19 wherein the proxy server system registers a file transfer request with the secure file transfer server that is an HTTPS request.

* * * * *